United States Patent
Kehr et al.

[15] 3,660,217
[45] May 2, 1972

[54] HONEYCOMB AND METHOD OF PRODUCING SAME

[72] Inventors: Clifton L. Kehr, Silver Spring; Walter R. Wszolek, Sykesville; Christian B. Lundsager, Ashton, all of Md.

[73] Assignee: W. R. Grace & Co., New York, N.Y.

[22] Filed: Feb. 20, 1969

[21] Appl. No.: 800,923

[52] U.S. Cl. ............................161/68, 156/197, 156/272, 156/331, 161/412, 204/159.22, 260/79
[51] Int. Cl. .......................................................B32b 3/12
[58] Field of Search ..............161/68, 69, 412; 156/197, 272, 156/327, 331, 334; 204/159.14, 159.18, 159.22, 159.24; 260/79

[56] References Cited

UNITED STATES PATENTS

| | | | |
|---|---|---|---|
| 3,006,798 | 10/1961 | Holland | 161/68 X |
| 3,114,666 | 11/1963 | Johnson | 161/68 X |
| 3,272,686 | 9/1966 | Smith et al. | 161/68 |
| 3,280,230 | 10/1966 | Bradshaw, Jr. et al. | 264/22 |
| 3,342,666 | 9/1967 | Hull | 161/135 |
| 3,365,525 | 1/1968 | Jackson | 156/197 |
| 3,484,335 | 12/1969 | Wismer et al. | 161/68 |
| 3,513,125 | 5/1970 | Kehr | 260/47 |

Primary Examiner—John T. Goolkasian
Assistant Examiner—Henry F. Epstein
Attorney—Richard P. Plunkett and Kenneth E. Prince

[57] ABSTRACT

This invention relates to a method and means for laminating superimposed layers of the same or different material by adhering said layers with a novel curable liquid adhesive composition comprising a polyene and a polythiol which, on exposure to ionizing radiation or a free radical generating agent, cures to a solid adhesive under ambient conditions. The novel adhesive can be used in bonding structural cellular material such as honeycomb cores and facings.

25 Claims, 5 Drawing Figures

PATENTED MAY 2 1972
3,660,217
SHEET 1 OF 3
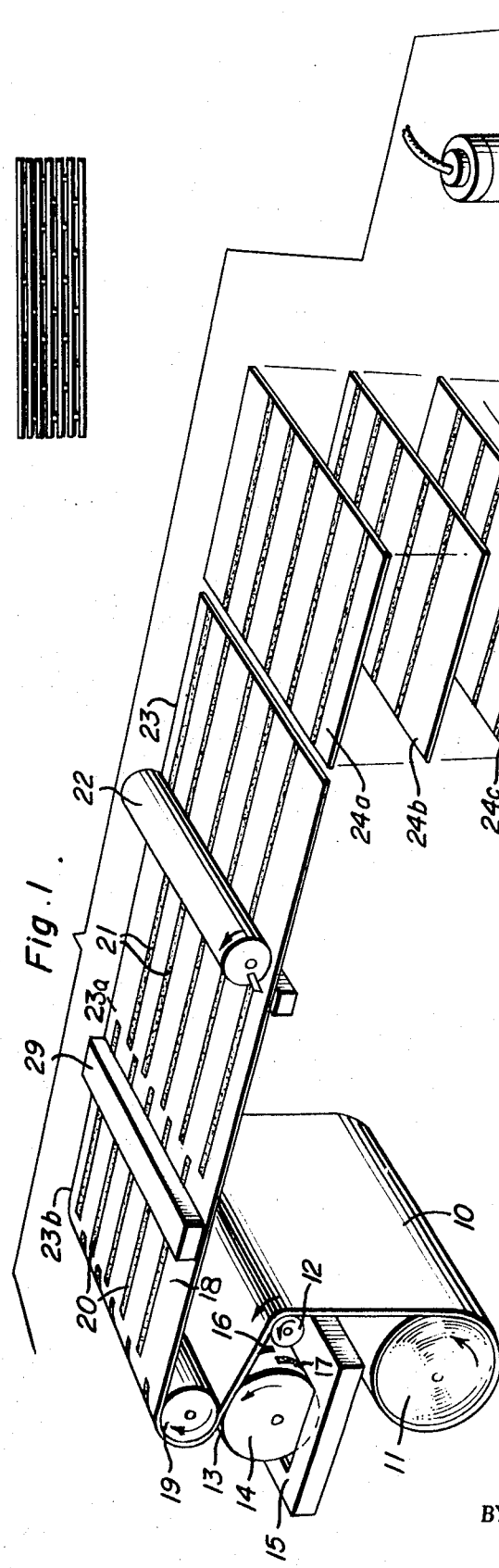
Fig. 1.
Fig. 2
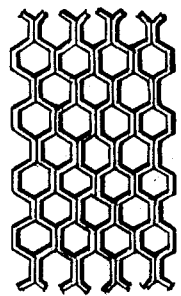
Fig. 3
Clifton L. Kehr
Walter R. Wszolek
Christian B. Lundsager
INVENTORS
BY Richard V. Plunkett
ATTORNEY Clifton L. Kehr
Walter R. Wszolek
Christian B. Lundsager
INVENTORS

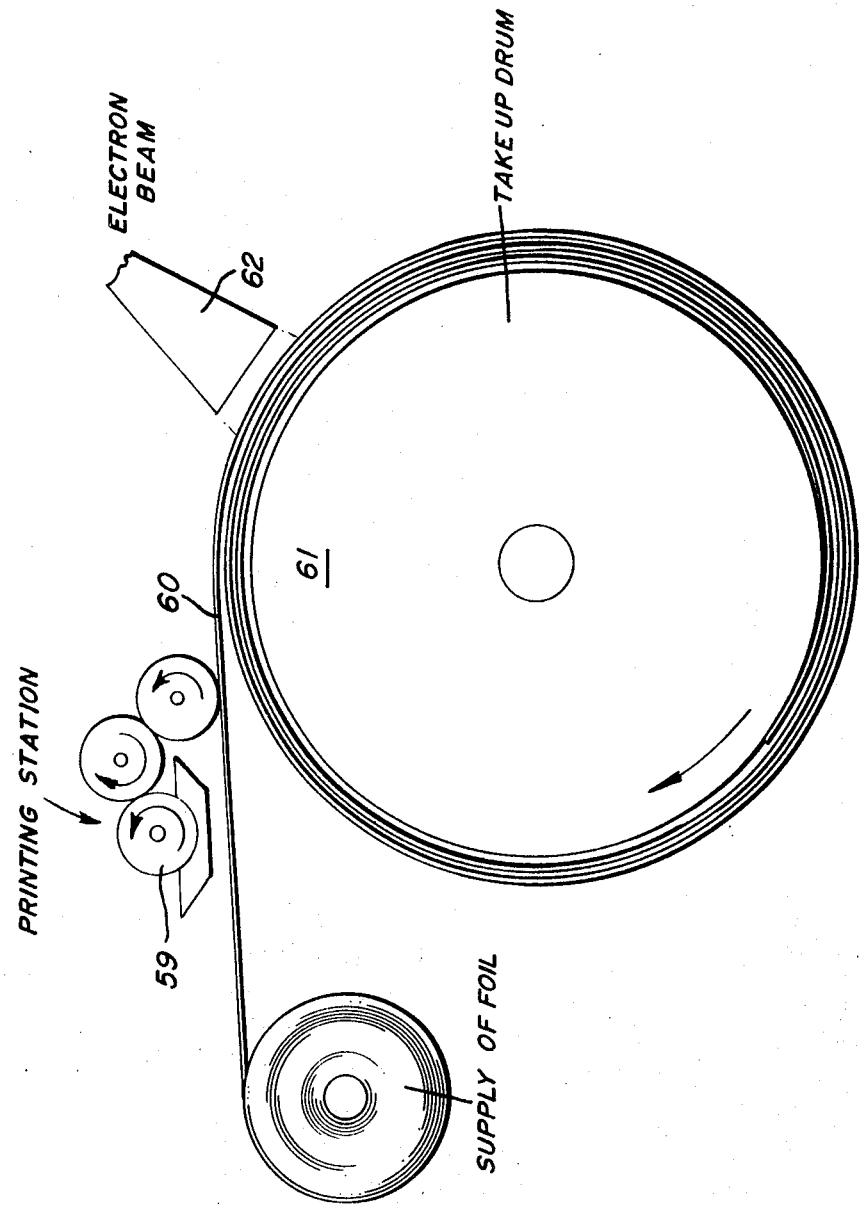

HONEYCOMB AND METHOD OF PRODUCING SAME

In the laminating field today the prevalent method of forming a laminate is to take layers cut to the desired size and shape, insert therebetween an adhesive and cure the adhesive while maintaining said layers under pressure at elevated temperatures. For materials such as wood which have sufficient polar groups to bond with the adhesive, the adhesive used is usually phenol formaldehyde or urea formaldehyde which require a fairly extensive time period at the elevated temperatures under high pressures to effect curing of the adhesive. These elevated temperatures can often times cause distortion in the layers being laminated. Additionally, some metal alloys, e.g., aluminum alloys, cannot tolerate high temperatures because they lose their strength characteristics and become brittle.

For non-polar materials such as metals, the adhesive is usually an epoxy type resin. However, after the epoxy type resin is admixed with the hardener material, the adhesive has limited pot life and must be used within a relatively short period before curing takes place.

One object of the instant invention is to produce an adhesive composition which does not require elevated heat and pressure to effect curing.

Another object of the instant invention is to provide an adhesive composition that has an extensive pot life which is not dependent upon admixture with other materials. These and other objects will become apparent from a reading hereinafter.

Summarily, the above and other objects are obtained by forming a liquid curable adhesive composition comprising a polyene containing at least two reactive unsaturated carbon to carbon bonds per molecule and a polythiol containing at least two thiol groups per molecule, the total combined functionality of (a) the reactive unsaturated carbon to carbon bonds per molecule in the polyene and (b) the thiol groups per molecule in the polythiol being greater than 4, applying said adhesive composition to at least one surface of each of the various layers to be laminated, forming said layers into a sandwich, optionally passing said sandwich through a mechanism to compress said sandwich, e.g., nip rolls, and thereafter subjecting said sandwich to ionizing radiation to cure said adhesive.

Honeycomb core may be produced by applying to opposite sides of an elongated web or sheet of material the polyenepolythiol adhesive in alternately spaced or staggered lines. By lapping the sheet back and forth over itself, superimposed layers of the material with the adhesive lines thereon are built up into a stack of unexpanded honeycomb. The unexpanded honeycomb is then exposed to ionizing radiation to cure the adhesive and bond the layers in the stack together. The stack can thereafter be sliced, preferably transversely, through the lines of adhesive to form one or several blocks or slices of unexpanded honeycomb. The unexpanded honeycomb can thereafter be expanded by conventional means such as applying uniform expansion forces to opposite end webs of the block or stack at a plurality of substantially equidistantly spaced sites throughout the lengths of each end web of the material. The expanded cores can then be adhered to facings using a different adhesive system or, if appropriate, the same adhesive composition cured by ionizing radiation.

The polythiols and one group of operable polyenes which can be cured rapidly as an adhesive by the practice of the instant invention are set out in a copending application assigned to the same assignee having Ser. No. 617,801 filed Feb. 23, 1967, now abandoned and are incorporated herein by reference. That is, one group of polyenes operable in the instant invention are those having a molecular weight in the range 50 to 20,000, a viscosity ranging from 0 to 20 million centipoises at 70° C of the general formula:

$$[A]-(X)_m$$

wherein X is a member of the group consisting of

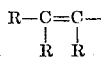

and R-C≡C—; m is at least 2; R is independently selected from the group consisting of hydrogen, halogen, aryl, substituted aryl, cycloalkyl, substituted cycloalkyl, aralkyl, substituted aralkyl and alkyl and substituted alkyl groups containing one to 16 carbon atoms and A is a polyvalent organic moiety free of (1) reactive carbon to carbon unsaturation and (2) unsaturated groups in conjunction with the reactive ene or yne groups in X. Thus A may contain cyclic groupings and minor amounts of hetero atoms such as N, S, P or O but contains primarily carbon-carbon, carbon-oxygen or silicon-oxygen containing chain linkages without any reactive carbon to carbon unsaturation.

Examples of said operable polyenes include, but are not limited to (1) crotyl-terminated polyurethanes which contain two "reactive" double bonds per average molecule in a near terminal position of the average general formula:

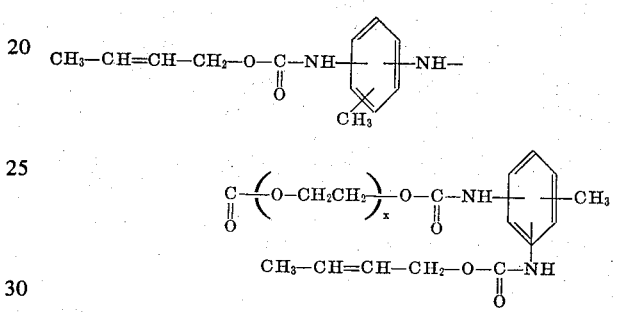

wherein x is at least 1.

(2) ethylene/propylene/non-conjugated diene terpolymers, such as "Nordel 1040" manufactured by duPont which contains pendant "reactive" double bonds of the formula:

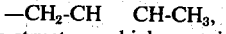

(3) the following structure which contains terminal "reactive" double bonds:

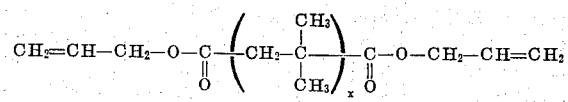

where x is at least 1, (4) the following structure which contains near terminal "reactive" double bonds:

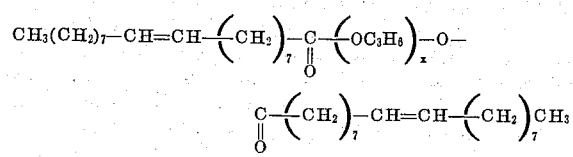

where x is at least 1.

As used herein polyenes and polyynes refer to simple or complex species of alkenes or alkynes having a multiplicity of pendant, terminally or near terminally positioned "reactive" carbon to carbon unsaturated functional groups per average molecule. For example, a diene is a polyene that has two "reactive" carbon to carbon double bonds per average molecule, while a diyne is a polyyne that contains in its structure two "reactive" carbon to carbon triple bonds per average molecule. Combinations of "reactive" double bonds and "reactive" triple bonds within the same molecule are also possible. An example of this is monovinylacetylene, which is a polyeneyne under our definition. For purposes of brevity all these classes of compounds will be referred to hereafter as polyenes.

A second group of polyenes operable in the instant invention includes unsaturated polymers in which the double or triple bonds occur primarily within the main chain of the molecules. Examples include conventional elastomers (derived primarily from standard diene monomers) such as polyiosprene, polybutadiene, styrene- butadiene rubber, isobutylene-isoprene rubber, polychloroprene, styrene-butadiene-acrylonitrile rubber, and the like; unsaturated polyesters, polyamides, and polyurethanes derived from monomers containing "reactive" unsaturation, e.g., adipic acid-butenediol, 1,6-hexanediamine-fumaric acid and 2,4-tolylene diisocyanate-butenediol condensation polymers and the like.

A third group of polyenes operable as part of the adhesive composition in this invention includes those polyenes in which the reactive unsaturated carbon to carbon bonds are conjugated with adjacent unsaturated groupings. Examples of operable reactive conjugated ene systems include, but are not limited to the following:

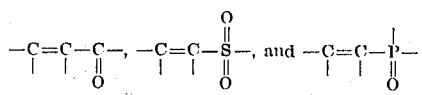

A few typical examples of polymeric polyenes which contain conjugated reactive double bond groupings such as those described above are polyethyleneether glycol diacrylate having a molecular weight of about 750, polytetramethyleneether glycol dimethacrylate having a molecular weight of about 1,175, the triacrylate of the reaction product of trimethylolpropane with 20 moles of ethylene oxide, and the like.

Another group of polyenes operable as part of the adhesive compositions having an —ene or —yne functionality of at least two are formed by reacting either a. An organic epoxide containing at least two

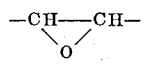

groups in its structure with a member of the group consisting of hydrazine, primary amines, secondary amines, tertiary amine salts, organic alcohols and organic acids wherein said group members contain at least one organic substituent containing a reactive ethylenically or ethynylically unsaturated group, or b. An organic epoxide containing at least one organic substituent containing a reactive ethylenically or ethynylically unsaturated group with a member of the group consisting of hydrazine and an organic material containing at least two active hydrogen functions from the group consisting of

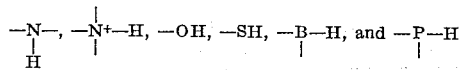

As used herein for determining the position of the reactive functional carbon to carbon unsaturation, the term "terminal" means that said functional unsaturation is at an end of the main chain in the molecule; whereas by "near terminal" is meant that the functional unsaturation is not more than 16 carbon atoms away from an end of the main chain in the molecule. The term "pendant" means that the reactive carbon to carbon unsaturation is located terminally or near-terminally in a branch of the main chain as contrasted to a position at or near the ends of the main chain. For purposes of brevity all of these positions will be referred to generally as "terminal" unsaturation.

The liquid polyenes operable in the instant invention contain one or more of the following types of non-aromatic and non-conjugated "reactive" carbon to carbon unsaturation:

(1) —CH=CH—
(2) —C≡C—
(3) —CH=CH$_2$
(4) —C≡CH
(5) —C=C—
(6) —C=CH—
(7) —CH=C—
(8) —C=CH$_2$

These functional groups as shown in 1—8 supra are situated in a position either which is pendant, terminal or near terminal with respect to the main chain but are free of terminal conjugation. As used herein the phrase "free of terminal conjugation" means that the terminal "reactive" unsaturated groupings may not be linked directly to non-reactive unsaturated species such as:

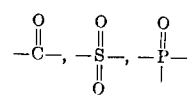

and the like so as to form a conjugated system of unsaturated bonds exemplified by the following structure:

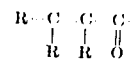

etc. On the average the polyenes must contain two or more "reactive" unsaturated carbon to carbon bonds/molecule and have a viscosity in the range from 0 to 20 million centipoises at 70° C. Included in the term "polyenes" as used herein are those materials which in the presence of an inert solvent, aqueous dispersion or plasticizer fall within the viscosity range set out above at 70° C. Operable polyenes in the instant invention have molecular weights in the range 50–20,000, preferably 500 to 10,000.

As used herein the term "reactive" unsaturated carbon to carbon groups means groups having the structures as shown in 1–8 supra which will react under proper conditions as set forth herein with thiol groups to yield the thioether linkage

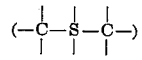

as contrasted to the term "unreactive" carbon to carbon unsaturation which means

groups when found in aromatic nucleii (cyclic structures exemplified by benzene, pyridine, anthracene, and the like) which do not under the same conditions react with thiols to give thioether linkages. In the instant invention, adhesive products from the reaction of polyenes with polythiols which contain two or more thiol groups per average molecule are called polythioether polymers or polythioethers.

As used herein, the term polythiols refers to simple or complex organic compounds having a multiplicity of pendant or terminally positioned —SH functional groups per average molecule.

On the average the polythiols must contain two or more —SH groups/molecule. They usually have a viscosity range of 0 to 20 million centipoises (cps) at 70° C as measured by a Brookfield Viscometer. Included in the term "polythiols" as used herein are those materials which in the presence of an inert solvent, aqueous dispersion or plasticizer fall within the viscosity range set out above at 70° C. Operable polythiols in the instant invention usually have molecular weights in the range 50–20,000, preferably 100–10,000.

The polythiols operable in the instant invention can be exemplified by the general formula: $R_8$—$(SH)_n$ where $n$ is at least 2 and $R_8$ is a polyvalent organic moiety free from reactive carbon to carbon unsaturation. Thus $R_8$ may contain cyclic groupings and minor amounts of hetero atoms such as N, S, P or O but primarily contains carbon-hydrogen, carbon-oxygen, or silicon-oxygen containing chain linkages free of any reactive carbon to carbon unsaturation.

One class of polythiols operable with polyenes in the instant invention to obtain a polythioether adhesive are esters of thiol-containing acids of the general formula: HS—$R_9$—COOH where $R_9$ is an organic moiety containing no "reactive" carbon to carbon unsaturation with polyhydroxy compounds of the general structure: $R_{10}$—$(OH)_n$ where $R_{10}$ is an organic moiety containing no "reactive" carbon to carbon unsaturation and n is 2 or greater. These components will react under suitable conditions to give a polythiol having the general structure:

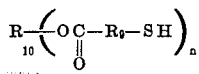

where $R_9$ and $R_{10}$ are organic moieties containing no "reactive" carbon to carbon unsaturation and $n$ is 2 or greater.

Certain polythiols such as the aliphatic monomeric polythiols (ethane dithiol, hexamethylene dithiol, decamethylene dithiol, tolylene-2,4-dithiol, etc. and some polymeric polythiols such as a thiol-terminated ethylcyclohexyl dimercaptan polymer, etc. and similar polythiols which are conveniently and ordinarily synthesized on a commercial basis, although having obnoxious odors, are operable in this invention but many of the end products are not widely accepted from a practical, commercial point of view. Examples of the polythiol compounds preferred for this invention because of their relatively low odor level include, but are not limited to, esters of thioglycolic acid ($HS-CH_2COOH$), α-mercaptopropionic acid ($HS-CH(CH_3)-COOH$) and β-mercaptopropionic acid ($HS-CH_2CH_2COOH$) with polyhydroxy compounds such as glycols, triols, tetraols, pentaols, hexaols, etc. Specific examples of the preferred polythiols include, but are not limited to, ethylene glycol bis(thioglycolate), ethylene glycol bis(β-mercaptopropionate), trimethylolpropane tris(thioglycolate), trimethylolpropane tris(β-mercaptopropionate), pentaerythritol tetrakis (thioglycolate) and pentaerythritol tetrakis (β-mercaptopropionate), all of which are commercially available. A specific example of a preferred polymeric polythiol is polypropylene ether glycol bis(β-mercaptopropionate) which is prepared from polypropylene ether glycol e.g., (e.g., P2010, Wyandotte Chemical Corp.) and β-mercaptopropionic acid by esterification.

The preferred polythiol compounds are characterized by a low level of mercaptan-like odor initially, and after reaction, give essentially odorless polythioether end products which are commercially attractive and useful adhesives for both indoor and outdoor applications.

The term "functionality" as used herein refers to the average number of ene or thiol groups per molecule in the polyene or polythiol, respectively. For example, a triene is a polyene with an average of three "reactive" carbon to carbon unsaturated groups per molecule and thus has a functionality ($f$) of three. A polymeric dithiol is a polythiol with an average of two thiol groups per molecule and thus has a functionality ($f$) of two.

It is further understood and implied in the above definitions that in these systems, the functionality of the polyene and the polythiol component is commonly expressed in whole numbers although in practice the actual functionality may be fractional. For example, a polyene component having a nominal functionality of 2 (from theoretical considerations alone) may in fact have an effective functionality of somewhat less than 2. In an attempted synthesis of a diene from a glycol in which the reaction proceeds to 100 percent of the theoretical value for complete reaction, the functionality (assuming 100 percent pure starting materials) would be 2.0. If however the reaction were carried to only 90 percent of theory for complete reaction, about 10 percent of the molecules present would have only one ene functional group, and there may be a trace of materials that would have no ene functional groups at all. Approximately 90 percent of the molecules, however, would have the desired diene structure and the product as a whole then would have an actual functionality of 1.9. Such a product is useful as an adhesive in the instant invention and is referred to herein as having a functionality of 2.

The aforesaid polyenes and polythiols, can if desired, be formed or generated in situ and still be rapidly cured by the process of the instant invention.

To obtain the maximum strength, solvent resistance, creep resistance, heat resistance and freedom from tackiness, the reactive adhesive components consisting of the polyenes and polythiols of this invention are formulated in such a manner as to give solid, crosslinked, three dimensional network polythioether polymer systems on curing. In order to achieve such infinite network formation the individual polyenes and polythiols must each have a functionality of at least 2 and the sum of the functionalities of the polyene and polythiol components must always be greater than 4. Blends and mixtures of the polyenes and the polythiols containing said functionality are also operable herein.

The adhesive compositions to be cured, i.e., (converted to solid resins or elastomers) in accord with the present invention may, if desired, include such additives an antioxidants, accelerators, dyes, inhibitors, activators, fillers, pigments, antistatic agents, flame-retardant agents, thickeners, thixotropic agents, surface-active agents, viscosity modifiers, extending oils, plasticizers, tackifiers and the like within the scope of this invention. Such additives are usual preblended with the polyene or polythiol prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 500 parts or more per 100 parts of the polyene-polythiol adhesive compositions by weight and preferably 0.005–300 parts on the same basis.

In all the curable adhesive systems herein, the compositions consist of 2 to 98 parts by weight of a polyene containing at least two reactive unsaturated carbon to carbon bonds per molecule and 98 to 2 parts by weight of a polythiol containing at least 2 thiol groups per molecule. If a free radical generating agent is used, it is present in an amount ranging from 0.01 to 10.0 parts by weight of the polyene-polythiol adhesive compositions.

The polyene-polythiol adhesive composition of the instant invention can be cured by ionizing irradiation. A preferred feature of the ionizing irradiation operation of the instant invention is treatment with high energy particle irradiation or by gamma-rays or x-rays. Irradiation employing particles in the instant invention includes the use of positive ions, (e.g., protons, alpha particles and deuterons), electrons or neutrons. The charged particles may be accelerated to high speeds by means of various voltage gradient mechanisms such as a Van de Graaff generator, a cyclotron, a Cockroft Walton accelerator, a resonant cavity accelerator, a betatron, a G. E. resonant transformer, a synchrotron or the like. Furthermore, particle irradiation may also be supplied from radioactive isotopes or an atomic pile. Gamma rays or x-rays may be obtained from radio isotopes (e.g., cobalt 60) or by particle bombardment of suitable target material e.g., high energy electrons on a gold metal target.

The dose rate for the irradiation operable to cure the adhesive in the instant invention is in the range 0.00001 to 10.0 megarads/second.

The amount of ionizing radiation which is employed in curing the polymeric adhesive material in the instant invention can vary between broad limits. Radiation dosages of less than a megarad up to 20 megarads or more for electrons are operable, preferably 0.1 to 5 megarads energy absorbed are employed. For gamma-rays or x-rays, radiation dosages in the range 0.0001 to 5.0 megarads energy absorbed are operable. The irradiation step can be performed at temperatures ranging from below room temperature up to 150° C or more with the temperatures above the polymer melting points in most cases affording greater crosslinking rates and efficiency.

When using ionizing radiation, the depth of penetration is dependent upon the density of the material to be penetrated. When the ionizing irradiation is in the form of electrons, 0.5 to 12 million electron volts (Mev) are usually employed. Where gamma rays or x-rays are employed, a range of 0.01 to 5.0 million electron volts is used. The aforesaid range of voltage will allow penetration of aluminum in the range of 1–1200 mils, of titanium in the range of 1–800 mils and of plastics in the range of 1–4,000 mils or more. Additionally if the plastic is in the form of precorragated foam, e.g., styrafoam, with densities as low as 0.5 lbs/ft. far greater depths of penetration are operable. As aforestated if such penetration is not sufficient to cure the adhesive to the entire depth desired when beaming the radiation from one direction only, one may use multiple radiation sources beaming simultaneously or intermittently from diametrically opposite sides of the laminate structure. If bonded thicknesses even greater than this are desired, one can adhere two or more irradiation-bonded sandwiches together using a chemical free radical generating agent which is not dependent on radiation energy to activate the polyene-polythiol adhesive.

The adhesive is usually applied to the substrate layers in thicknesses ranging from 0.05 to 10 mils, preferably about 0.2 to 5 mils.

The curing reaction between the polyene and the polythiol can also be initiated by any free radical mechanism which dissociates or abstracts the hydrogen atom from the SH group (or accomplishes the equivalent thereof) and which is operable under ambient conditions. Thus, it is possible to merely expose the polyene and polythiol admixture to ambient conditions (oxygen from the air is the initiator) and obtain a cured solid adhesive product. Azo compounds or peroxides (with or without amine accelerators) which decompose at ambient conditions are also operable as free radical generating agents capable of curing the polyene-polythiol components of the instant invention to solid adhesive products.

The source of free radicals can be various well known free radical generating agents such as organic peroxides, azo compounds, carbazates as taught in a copending application having Ser. No. 618,345, filed Feb. 24, 1967 and now U.S. Pat. No. 3,513,125 and assigned to the same assignee, metal salts capable of redox reactions, dioximes, diesters of dioximes and the like. Examples of operable organic peroxides include, but are not limited to, benzoyl peroxide; dicumyl peroxide; 2,5-dimethyl-2,5-di(t-butylperoxy)hexane; 2,5-dimethyl-2,5-di(t-butyperoxy)hexyne-3 and ditertiary bisperoxides of the general formula:

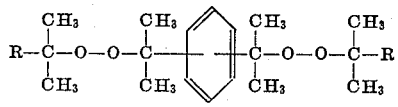

wherein R is a member of the group consisting of methyl and phenyl. Operable azo compounds include, but are not limited to 2-phenylazo -2,4,4-trimethylvaleramide; 2-phenylazoisobutyramide; 2-phenylazo-2,4,4-trimethylvaleronitrile, etc.

Various operable carbazates include, but are not limited to, methyl carbazate, ethyl carbazate, t-butyl carbazate, phenyl carbazate, myristyl carbazate, and the like. When UV transparent layers are being laminated, ultraviolet light (with or without chemical photoinitiators or sensitizers such as benzophenone, acetophenone, acenaphthene-quinone, methyl ethyl ketone, etc.) yields rapid cures by the practice of the instant invention. One instance where chemical free radical generating agents are employed in the instant invention instead of ionizing radiation is in the case when the ionizing radiation is insufficient to effect curing of the adhesive throughout the entire desired depth of the stack. In this instance, it is possible to cure the polyene and polythiol adhesive to the known penetration depth of the ionizing radiation and thereafter superimpose stacks of the material cured by ionizing radiation upon one another and cure the polyene-polythiol adhesive therebetween by the use of a chemical free radical generating agent. The thus cured stacks can then be cut transversed the adhesive lines and expanded into honeycomb cores by conventional means.

The adhesive may be a single component, i.e. the admixed polyene-polythiol; or a multi component, i.e. mix the polyene and the polythiol and apply on the site. It is preferred to use the single component system due to its ease of useage.

The curing mechanisms for the single component system are ionizing radiation, e.g., an electron beam which is preferred, or ultraviolet light plus a photocuring rate accelerator when the layers are U.V. transparent, and heat. For the multi component system it is possible to use free radical generating agents such as benzoyl peroxide plus a tertiary amine; benzilic acid; oxime esters plus iron salts and other well known chemical free radical generating agents.

The adhesive can be applied by various means. For example, the adhesive can be applied by extrusion; printing which is preferred and which is shown in U.S. Pat. No. 3,342,666; 3,006,798; 3,114,666; spraying, brushing, and the like. The polyene-polythiol adhesive can also be used in the form of tape or ribbon by impregnating or coating the polyene-polythiol composition on a woven or non-woven fabric as a support.

The layers which can be adhered and formed into honeycomb cores by the process of the instant invention can be metal foils which are preferred especially aluminum; steel and titanium; plastics as taught in U.S. Pat. No. 3,366,525 which may or may not be transparent to U. V. light, including but not limited to polyethylene, polypropylene, ethylene/propylene copolymer, propylene/vinyl chloride copolymer vinyl chloride/vinyl acetate copolymer, polyvinyl chloride, polyamide, polycarbonate and the like; styrofoam; resin impregnated fabrics both woven and nonwoven; paper; resin impregnated papers; ceramics as taught in U.S. Pat. No. 3,272,686; resin impregnated woven and nonwoven glass fiber composites which are also transparent to U. V. light in many cases and the like. The layers can be precorrugated and adhered by the process of this invention as well as expanded into honeycomb cores after adhesion.

The adhesive composition can be in many forms. That is, the composition can be 100 percent solids, i.e., without solvents present which is preferred; in liquid, wax, or solid state or thixotropic paste; solutions in organic solvents or plasticizers, dispersions, emulsions solutions in water.

In the drawings:

FIG. 1 discloses schematically one suitable apparatus for practicing the curing process.

FIG. 2 is an end elevation view of a cured stack of laminated material produced according to the Process of FIG. 1.

FIG. 3 is a fragmentary side plan view of an expanded section of the material shown in FIG. 2.

FIG. 5 is a diagrammatic view in end elevation of an alternate apparatus.

Figure 4:
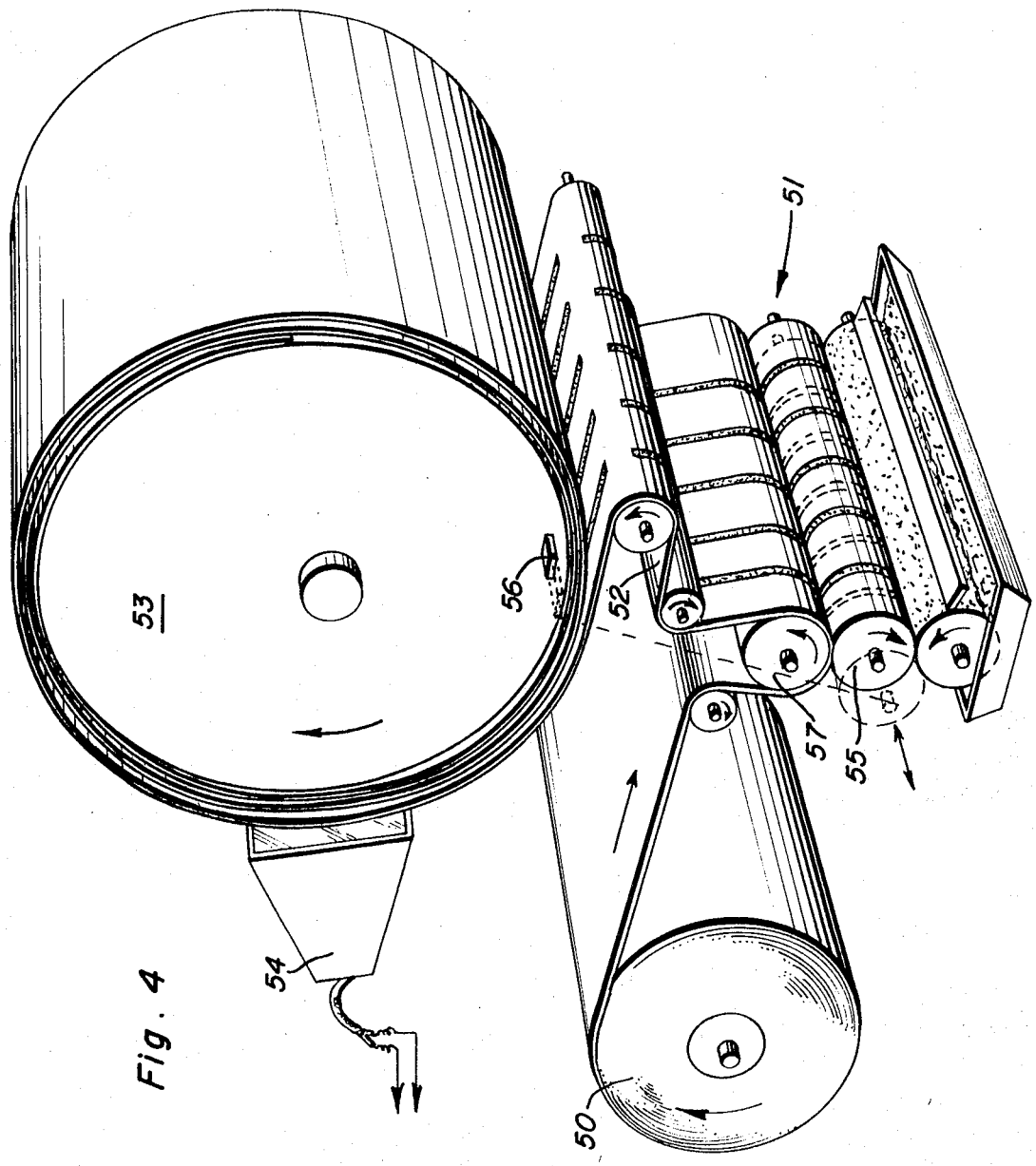
FIG. 4 shows in schematic perspective a view of an apparatus for making honeycomb slab on a larger scale in a more continuous manner, utilizing the near instantaneous curing of the liquid polyene/polythiol adhesives.

FIG. 1 illustrates one method of producing the article shown in FIG. 2. The reference numeral 10 indicates a continuous web of sheet material, such as metal foil, e.g., aluminum, paper, sheet plastic, foam plastic, resin impregnated textile or glass fabric, or the like being fed from a continuous roll 11 over a guide roll 12 and through an adhesive application station indicated generally at 13. More particularly, station 13 can comprise a rotogravure type applicating cylinder 14 mounted so that its lower periphery is submerged in a bath of the liquid polyene/polythiol adhesive 15. The circumference of the cylinder 14 is provided with etched lines 16 and 17 which define the pattern of the adhesive lines being applied to surface 18 of the continuous web as the latter moves between the gravure cylinder 14 and a conventional backup roller 19. In FIG. 1 the etched lines 16 extend halfway around the periphery of drum 14 along parallel axis; while etched lines 17 extend the other half the circumference of the drum along parallel axis thereby forming staggered lines of adhesive on each layer in the stack. Thus, rotation of the drum through 180° will cause adhesive line 16 to be applied to surface 18 of the web whereas rotation of the drum through its other half cycle will cause adhesive line 17 to be imprinted thereon. This causes the pattern of the etched lines 20 and 21 to be affixed to the web in staggered relationship. The continuous web with the adhesive thereon is then cut into rectangular sheets of equal dimension by a conventional suitable cutter mechanisms indicated at 22. Specifically, the web material is sheared along spaced transverse cut lines 23a and 23b, which coincide with the line of juncture between adhesive lines 20 and 21 as said lines appear repetively along the length of the web.

The result of the above process is to provide rectangular sheets of the web material of equal dimension such as indicated at 24a-d, said sheets being provided with parallel adhesive bonding lines 20 and 21 in staggered relationship to each other. The sheets are superimposed in a stack 25 touching one another along the spaced parallel adhesive bonding lines 20 and 21, said bonding lines uniting each sheet with said bonding lines touching each sheet with the first adjacent sheet being in staggered relationship to the bonding lines uniting said sheet with a second adjacent sheet. The stack of material 25 is placed on a conveyor belt 26 and passed through compressive means, e.g., nip rolls 27 maintain the layers in pressed uniformly stacked relationship and to exclude air from between said layers. The stack 25 on exiting the nip rolls 27 is passed under ionizing irradiation source 28 whereat the stack across its entire width is subjected to high energy particle irradiation or gamma rays or x-rays penetrable to the entire depth of the stack. Such irradiation causes curing of the polyene/polythiol adhesive composition almost instantaneously, i.e., 0.5 to 5 seconds.

The thus cured stack 25 may be expanded or opened out into cellular pattern, or the stack may be stored or sheared along parallel cut lines $C_1$ or $C_2$ to form smaller sections or slices of the laminated material which are capable of being expanded or opened out into cellular structure resembling the honeycomb material shown in FIG. 3. Various conventional methods of expanding the laminated material are well known in the art and can be employed in the instant invention such as the method described in U.S. Pat. No. 2,674,295.

In FIG. 4, 50 is a roll of sheet material e.g., paper, plastic, metal foil or the like which is fed through a printing apparatus 51 where the adhesive is applied in a line pattern running lengthwise on the sheet material 52. The printed sheet is wound on a large drum 53 in helical fashion with the adhesive layer towards the center of the drum. An electron beam generator 54 irradiates the adhesive through the layer of sheet metal. Such beams can penetrate several layers of material and the curing of the adhesive may be completed on the first pass or after several passes around the drum, depending on the intensity of the beam and the speed of the drum.

This process is continued until sufficient number of layers are build up on the drum. In order to give the staggering of the adhesive lines on successive layers, which is necessary for expanding into a honeycomb, the printing roller 55 is moved axially by one-half of the distance between the adhesive lines, once per turn of the drum 53. This axial movement is done by mechanical or other means, not shown, and is controlled by a trigger 56 on the drum. To avoid smearing of the adhesive the backup roll, 57, can be lifted momentarily while the displacement of the print roll takes place. The result will be that a small part of the lay-up of sheet material on the drum at the same position on the drum will not be adhesive coated.

When sufficient layers have been build up on the roll the winding is stopped after cutting the sheet before the printing station. The rotation must be continued long enough to assume complete cure of the topmost adhesive layer in the lay-up.

The complete lay up is moved from the drum axially, and is subsequently cut at that point of its circumference where the discontinuity of all the adhesive lines is located. The cylindrical lay-up is then flattened out by conventional means such as a sheet rolling mill. In order to make this possible, without excessive distortion of the individual layers in the lay-up, the diameter of the drum 53 must be large relative to the total thickness of the lay-up. By large is meant 10 times or more the thickness of the lay-up, preferably 20 times or more.

The flattened lay-up is then sheered as previously described to provide slices for expansion into honeycomb.

In FIG. 5, the printing from printing station 59 is applied to the side of the sheet material 60 on the side away from the center of the take up drum 61. Thus, by passing under the electron beam 62 the adhesive is cured without the shielding of the layer of sheet material on top. The speed must be great enough to give partial curing only, so that sufficient tack of the adhesive is retained to form a good bond when covered with the next layer of sheet material. As before, the curing continues to completion on successive turns of the drum, and similar means to those described with FIG. 4 are used to give staggered printing of the adhesive. This process, by allowing more intensive cure initially has the advantage of operating at greater speed and because of the partial cure of the adhesive before it becomes part of the lay-up, will give a narrower glue line which can be desirable.

A further modification of this type of apparatus not shown makes possible the fabrication of honeycomb sheet of extremely large dimensions. In this modification the adhesive lines are printed on sheet material perpendicular to the direction of length of the sheet material. In all the other modifications the width of the finished expanded honeycomb product is limited to less than the width of the sheet material. With the adhesive printing pattern here described

What is claimed is:

1. A sandwich structure comprising a pair of surface sheets, a honeycomb core interposed between said surface sheets with the direction of the cells extending normal to the surface sheets, whereby the edges of the cells are opposite the inner surfaces of said surface sheets, adhesive means for bonding the edges of said honeycomb core to the respective surface sheets comprising an adhesive composition consisting essentially of a polyene containing at least two reactive unsaturated carbon to carbon bonds per molecule and a polythiol containing at least two thiol groups per molecule, the total combined functionality of (a) the reactive unsaturated carbon to carbon bonds per molecule in the polyene and (b) the thiol groups per molecule in the polythiol being greater than four; said adhesive composition on being subjected to ionizing radiation at a dose rate in the range 0.00001 to 10.0 megarads/second causing bonding of the edges of said honeycomb core to the respective surface sheets.

2. The structure according to claim 1 wherein the polyene is formed by reacting either A. an organic epoxide containing at least two

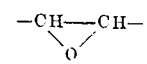

groups in its structure with a member of the group consisting of hydrazine, primary amines, secondary amines, tertiary amine salts, organic alcohols and organic acids wherein said group members contain at least one organic substituent containing a reactive ethylenically or ethynylically unsaturated group, or B. an organic epoxide containing at least one organic substituent containing a reactive ethylenically or ethynylically unsaturated group with a member of the group consisting of hydrazine and an organic material containing at least two active hydrogen functions from the group consisting of

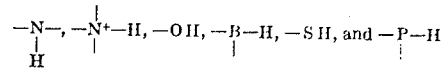

3. The structure according to claim 1 wherein the polyene is the reaction product of 1 mole of diglycidyl ether of Bisphenol A and 2 moles of allyl hydrazine.

4. The structure according to claim 1 wherein the polyene is the reaction product of 1 mole of diglycidyl ether of Bisphenol A and 2 moles of allyl amine.

5. The structure according to claim 1 wherein the polyene is the reaction product of 1 mole of diglycidyl ether of Bisphenol A and 2 moles of diallyl amine.

6. The structure according to claim 1 wherein the polyene is triallyl urea.

7. The structure according to claim 1 wherein the polyene is diallylallylphosphonate.

8. The structure according to claim 1 wherein the polythiol is a member of the group consisting of pentaerythritol tetrakis (β-mercaptopropionate) and trimethylolpropane tris (β-mercaptopropionate).

9. The process of making a honeycomb structure from a laminates stack of web material which comprises
   A. applying to sections of the web material, lines of an adhesive composition consisting essentially of a polyene containing at least two reactive unsaturated carbon to carbon bonds per molecule and a polythiol containing at least two thiol groups per molecule, the total combined functionality of (a) the reactive unsaturated carbon to carbon bonds per molecule in the polyene and (b) the thiol groups per molecule in the polythiol being greater than 4;
   B. forming a plurality of said sections in a stack with said lines of adhesive between adjacent sections arranged in staggered relationship;
   C. subjecting said stack to ionizing radiation at a dose rate in the range 0.0001 to 10.0 megarads/second to cure the adhesive and bond said sections and
   D. expanding said stack to form a honeycomb structure having a plurality of hollow cells.

10. The process according to claim 9 wherein the polyene is formed by reacting either
    A. an organic epoxide containing at least two

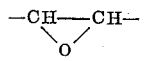

groups in its structure with a member of the group consisting of hydrazine, primary amines, secondary amines, tertiary amines amine salts, organic alcohols and organic acids wherein said group members contain at least one organic substituent containing a reactive ethylenically or ethynylically unsaturated group, or
    B. an organic epoxide containing at least one organic substituent containing a reactive ethylenically or ethynylically unsaturated group with a member of the group consisting of hydrazine and an organic material containing at least two active hydrogen functions from the group consisting of

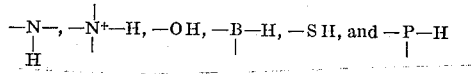

11. The process according to claim 10 wherein the polyene is the reaction product of 1 mole of diglycidyl ether of Bisphenol A and 2 moles of allyl hydrazine.

12. The process according to claim 10 wherein the polyene is the reaction product of 1 mole of diglycidyl ether of Bisphenol A and 2 moles of allyl amine.

13. The process according to claim 10 wherein the polyene is the reaction product of 1 mole of diglycidyl ether of Bisphenol A and 2 moles of diallyl amine.

14. The process according to claim 9 wherein the polyene is triallyl urea.

15. The process according to claim 9 wherein the polyene is diallylallylphosphonate.

16. The process according to claim 9 wherein the polythiol is a member of the group consisting of pentaerythritol tetrakis (β-mercaptopropionate) and trimethylolpropane tris (β-mercaptopropionate).

17. The process of bonding at least two unexpanded honeycomb cores together which comprises
    1. applying between superposed unexpanded honeycomb cores, lines of an adhesive composition consisting essentially of 2 to 98 parts by weight of a polyene containing at least two reactive unsaturated carbon to carbon bonds per molecule, 98 to 2 parts by weight of a polythiol containing at least two thiol groups per molecule and 0.01 to 10 parts by weight of the polyene-polythiol composition of a free radical generating agent, the total combined functionality of (a) the reactive unsaturated carbon to carbon bonds per molecule in the polyene and (b) the thiol groups per molecule in the polythiol being greater than 4, said lines of adhesive being in staggered relationship to the adjacent lines of adhesive on the superposed honeycomb cores, and
    2. maintaining said superposed honeycomb cores in contact for a time sufficient to cure the adhesive and effect bonding between said unexpanded honeycomb cores.

18. The process according to claim 17 wherein the polyene is formed by reacting either
    A. an organic epoxide containing at least two

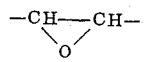

groups in its structure with a member of the group consisting of hydrazine, primary amines, secondary amines, tertiary amine salts, organic alcohols and organic acids wherein said group members contain at least one organic substituent containing a reactive ethylenically or ethynylically unsaturated group, or
    B. an organic epoxide containing at least one organic substituent containing a reactive ethylenically or ethynylically unsaturated group with a member of the group consisting of hydrazine and an organic material containing at least two active hydrogen functions from the group consisting of

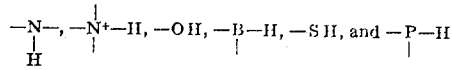

19. The process according to claim 17 wherein the polyene is the reaction product of 1 mole of diglycidyl ether of Bisphenol A and 2 moles of allyl hydrazine.

20. The process according to claim 17 wherein the polyene is the reaction product of 1 mole of diglycidyl ether of Bisphenol A and 2 moles of allyl amine.

21. The process according to claim 17 wherein the polyene is the reaction product of 1 mole of diglycidyl ether of Bisphenol A and 2 moles of diallyl amine.

22. The process according to claim 17 wherein the polyene is triallyl urea.

23. The process according to claim 17 wherein the polyene is diallyallylphosphonate.

24. The process according to claim 17 wherein the polythiol is a member of the group consisting of pentaerythritol tetrakis (β-mercaptopropionate) and trimethylolpropane tris (β-mercaptopropionate).

25. The process according to claim 17 wherein the free radical generating agent is selected from the group consisting of organic peroxides, azo compounds, carbazates, metal salts capable of redox reactions, dioximes and diesters of dioximes.

* * * * *